United States Patent Office 3,552,881
Patented Jan. 5, 1971

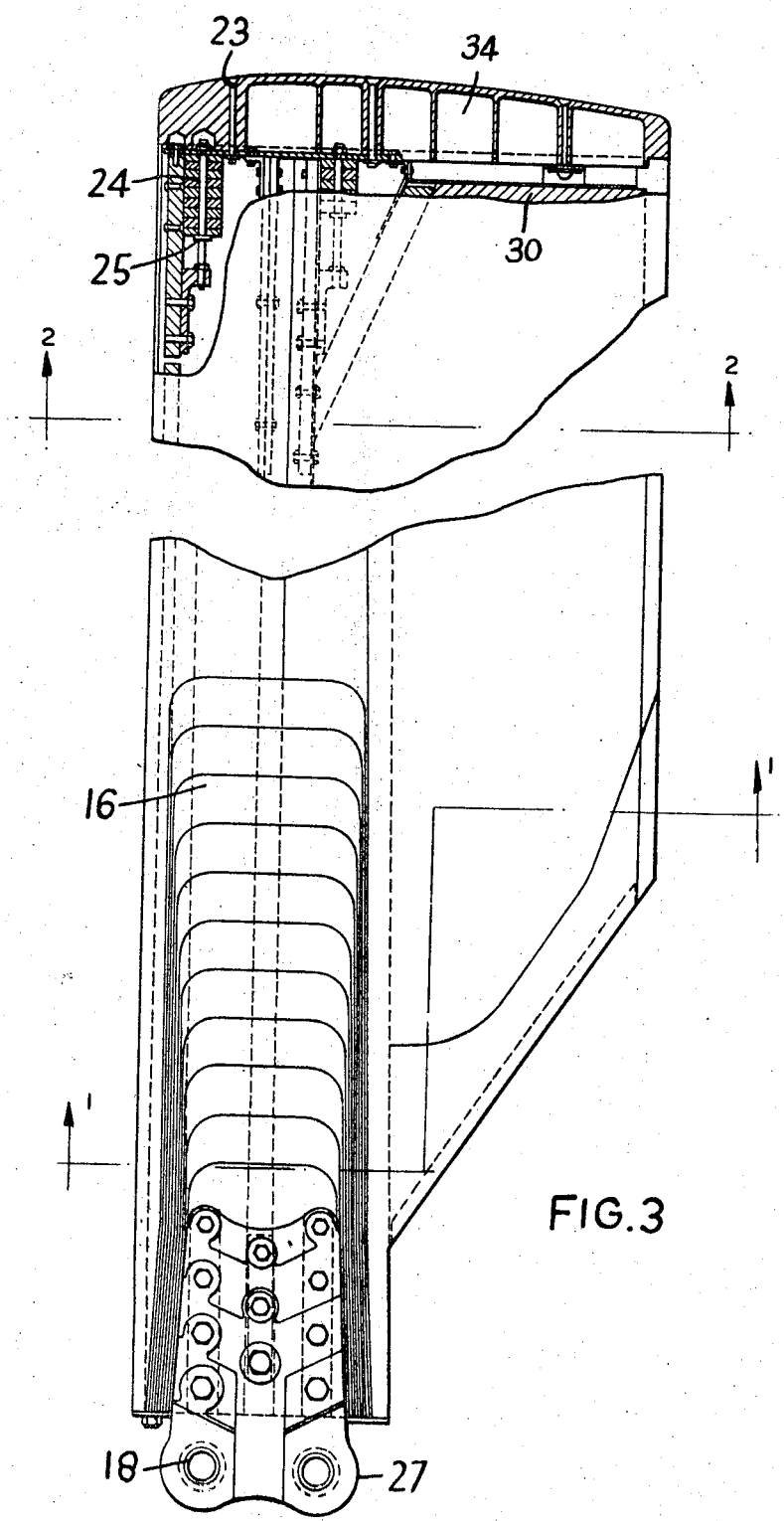

3,552,881
CONSTRUCTION OF ROTOR BLADES FOR ROTARY WING AIRCRAFT
Victor A. B. Rogers, Sherborne, and Anthony B. D. Leigh, Yeovil, England, assignors to Westland Aircraft Limited, Yeovil, Somerset, England
Filed July 5, 1968, Ser. No. 742,844
Claims priority, application Great Britain, May 20, 1968, 23,885/68
Int. Cl. B64c *27/46*
U.S. Cl. 416—145      25 Claims

ABSTRACT OF THE DISCLOSURE

This invention relates to the construction of rotor blades for rotary wing aircraft, and in particular, helicopters.

---

It is an object of the invention to provide an improved rotor blade giving good aerodynamic performance with low vibration levels, extended blade life with complete blade interchangeability, resistance to operational and handling damage, coupled with the stability to be able to carry out certain limits of repair, both in the field and the factory.

At the same time the blade should have good resistance to erosion and corrosion, also weight and production costs kept to a minimum consistent with the advantages of the above features.

According to the invention we provide a rotor blade wherein the main spar of the blade is formed from a hollow box structure comprising two opposed U-shaped members, one being re-entrant to the other, said spar tapering from its root to tip, both chordwise and in thicknesss of the material, the spar having a substantially constant twist about its horizontal centreline of preferably between 7° and 9°, said blade being completed by the addition of an aerofoil section leading edge and trailing edge portion.

In a preferred embodiment of the invention we provide a truncated V-shaped subsidiary spar of tapered form interposed between the aerofoil section leading edge and the box spar structure, said spar maintaining the aerofoil shape of the leading edge and preventing skin distortion between the spars.

In another feature of the invention the trailing edge portion of the blade comprises a skinned honeycomb structure bonded to the box spar structure.

In a further feature of the invention a subsidiary spar carries chordwise balance weight(s) retained by attachment means at the root of the blade and adjustable balance weights located at the outboard tip of the rotor blade, said weights may be adjustable or fixed and may be attached to spar sections at or adjacent to the blade outboard tip.

In another feature of the invention the skin comprises a moulded resin impregnated fibreglass covered by a protective layer of plastic or synthetic material, and a tip capping section of synthetic or plastic material completes the trailing edge portion of the blade. A further capping section is attached to the spar or spars at the tip of the blade, at least part of the capping section being covered by metal protective means.

In a further feature of the invention a series of reinforcing plates of decreasing length and width are bonded to a first plate, said plate being bonded to an inboard portion of the spar.

In another feature of the invention a root end fitting is bonded and bolted to the series of reinforcing plates and to the spar at substantially the quarter chordline of the blade, said root and fittings being provided with means of attachment to the rotor hub, the first reinforcing plate being bonded to the leading edge section and filler plates attached to the box spar.

A further feature of the invention provides filler plates to stabilise the box spar structure, and utilised to carry loads lengthwise along the rotor blade, and hollow spacer means within the box spar and/or the cavity between the spars to receive securing bolts.

In another feature of the invention each web portion of the spar units within the completed blade lie substantially in the same plane throughout the blade length.

One embodiment of the invention will now be described, by way of example, with reference to the accompanying drawings, in which:

FIG. 3 shows a plan view of the blade with a cutaway portion at the outboard tip of the blade.

Figure 1:
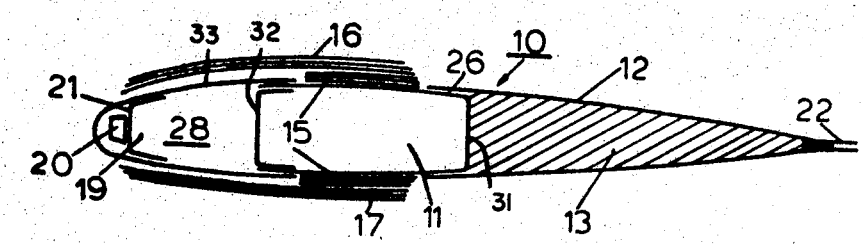
FIG. 1 shows a diagrammatic exploded cross-section of the blade at or near the root, taken along line 1—1 of FIG. 3.

Referring to FIG. 1, the numeral 10 generally indicates the blade cross-section constructed according to the invention. The blade includes a box-type spar structure 11 constructed from two U sections 31 and 32, one being substantially completely received in the other. The sections 31 and 32 are joined by bonding or other suitable means to present substantially uninterrupted upper and lower surfaces throughout the blade length. A leading edge portion 33 of aerofoil section is bonded to the forward surfaces of the box spar member 11, the blade being completed by a rear portion comprising a glass reinforced plastic skin 12 supported by a honeycomb structure 13, and bonded to the rear surfaces of the box spar member 11 at joints 26. A number of filler plates 15 are bonded to upper and lower surfaces of the spar member 11 to build up the wall thickness and at the root end of the blade. Top and bottom reinforcing plates 16 and 17 are bonded and bolted to the box spar member 11 and the leading edge portion 33 through filler plates 15 to form the blade to hub attachment by bushed bolt housings 18 in root end fitting 27 (FIG. 3). A subsidiary spar 19 of truncated V section reinforces and stabilises the leading edge aerofoil portion 33 and is located at a constant chord percentage throughout the blade length.

A balance bar 20 is bonded and/or rivetted to the forward channel web 21 of subsidiary spar 19, to provide chordwise balance, said bar 20 may be separate from the spar and attached to or adjacent to the leading edge.

The tip portion of blade 10 is completed by a capping section 34 (FIG. 3) of plastic or synthetic material, and is in part covered by protective metal means 23. Provision is made for the fitting of adjustable balance weights 24 (FIG. 3). These may be attached to spar sections or by special attachment means 25, as shown in FIG. 3.

Figure 2:
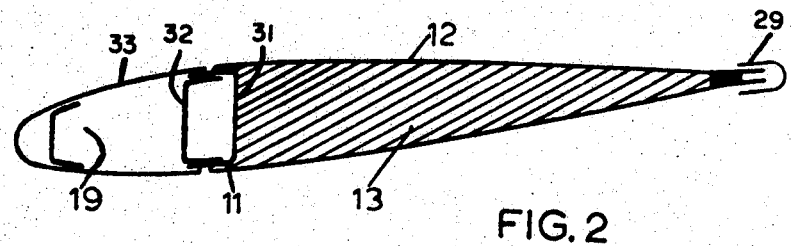
FIG. 2 shows a cross-section of the blade at or near the tip, and taken along line 2—2 of FIG. 3.

The box spar member 11 tapers both chordwise and in thickness from root to tip, said taper being related to 50% of the blade chord and at the root and 30% at the tip. Said spar structure also incorporates a built-in twist about its horizontal centreline of preferably between 7° and 9° (refer to FIG. 2).

Filler plates 15 are attached to upper and lower surfaces of the spar 11 by bonding or other means to stabilise the structure.

At the root end a series of reinforcing plates 16 and 17 of decreasing length and width are attached by bonding or other means to the filler plates 15, said reinforcing plates building the sides of the rear section of spar 11 up to the level of the front section, and extending over both spar 11 and the leading edge section 33.

A root end fitting 27 (FIG. 3) is bolted and may also be bonded to the reinforcing plates 16 and 17 to form the attachment to the rotor hub. It is essential that this fitting 27 should be fitted in the same operation relating to the fitting of the reinforcing plates. Hollow spacer means are provided within the box spar 11 and/or the cavity 28 (FIG. 1) between the spars to receive securing bolts.

The skin covering 12 of the blade is built up from a number of layers of preimpregnated fibreglass, the warp and weft running spanwise and chordwise. Packing is provided over the spar/skin bond area to build up to the correct thickness, and the whole skin is covered by a protective layer of plastic or synthetic material. The rear portion of aerofoil section terminates in a trailing edge joint 22 between the upper and lower skins, the joint being protected by a plastics capping strip 29.

Referring to FIG. 3, a metal sheet 30 is moulded into the bottom skin to provide erosion protection near the tip of the blade.

The reinforcing plates 16 of decreasing length and width with root end fitting 27 are shown in plan (FIG. 3) giving their dimensional relationship to the blade.

The joint 26 between the fibreglass skins and the spar member 11 (FIG. 1) has been kept clear of the reinforcing and filler plates 15, 16 and 17, to enable a damaged trailing portion to be removed and replaced.

It will be appreciated by those skilled in the art that departure may be made from the method of construction as hereinbefore described, without departing from the scope of the invention, furthermore, materials other than those specified may be suitable for the construction of a blade according to the invention.

We claim as our invention:

1. A rotor blade wherein the main loading bearing spar of the blade is formed from a hollow box structure comprising two opposed U-shaped members, one of said members being substantially contained completely within the other, the cross-section of the spar in the direction generally horizontally across the blade becoming smaller from root of the blade to tip thereof, the spar having a substantially constant twist about its horizontal longitudinal centreline of approximately between 7° and 9°, said blade being completed by the addition of an aerofoil section leading edge and a trailing edge portion.

2. A rotor blade according to claim 1, wherein a subsidiary truncated V-shaped spar of tapered form is interposed between the aerofoil section and the box spar structure.

3. A rotor blade according to claim 2, including a subsidiary spar which carries chordwise balance weights.

4. A rotor blade according to claim 3, wherein said chordwise balance weight is retained between said subsidiary spar and the aerofoil section.

5. A rotor blade according to claim 3, wherein said chordwise balance weight is retained by attachment means at the root end of the blade.

6. A rotor blade according to claim 2, wherein said subsidiary spar is arranged to maintain the aerofoil shape of the leading edge and to prevent skin distortion between said spars.

7. A rotor blade according to claim 1, wherein the trailing edge portion of said blade comprises a skinned honeycomb structure bonded to the box spar.

8. A rotor blade according to claim 1, wherein filler plates are provided between the trailing edge of the front section and the leading edge of the trailing edge portion.

9. A rotor blade according to claim 1, wherein the trailing edge portion of the blade includes a capping section.

10. A rotor blade according to claim 6, wherein the skin comprises a moulded resin impregnated fibreglass covered by a protective layer of plastic or synthetic material.

11. A rotor blade according to claim 9, wherein the said capping section is of plastic or synthetic material.

12. A rotor blade acording to claim 1, wherein an outboard end tip capping of moulded plastic material is attached to the outboard section of the spar or spars.

13. A rotor blade according to claim 12, wherein the tip capping is in part covered by metal protective means.

14. A rotor blade according to claim 1, including adjustable balance weights on said blade.

15. A rotor blade according to claim 14, wherein adjustable balance weights are located at the outboard tip of the rotor blade.

16. A rotor blade according to claim 14, wherein fixed balance weights are attached to spar sections at or adjacent to the outboard tip of the blade.

17. A rotor blade according to claim 1, wherein a reinforcing plate is bonded to an inboard portion of the spar.

18. A rotor blade according to claim 17, wherein a series of reinforcing plates of decreasing length and width are bonded to the reinforcing plate.

19. A rotor blade according to claim 18, wherein a root end fitting is bolted and bonded to the series of reinforcing plates and to the spar at substantially the quarter chordline of the blade.

20. A rotor blade according to claim 18, wherein hollow spacer means are provided within the box spar and/or the cavity between the spars to receive securing bolts.

21. A rotor blade according to claim 19, wherein the root end fittings are provided with means of attachment to a rotor hub.

22. A rotor blade according to claim 8, wherein the said filler plates includes means for carrying loads lengthwise along the rotor blade.

23. A rotor blade according to claim 17, wherein the first reinforcing plate is bonded to the leading edge section and the filler plate attached to the box spar.

24. A rotor blade according to claim 22, wherein said filler plates include means to stabilise the box spar structure.

25. A rotor blade according to claim 1 wherein each web portion of the spar units within the completed blade lie substantially in the same plane throughout their length.

References Cited

UNITED STATES PATENTS

| | | | |
|---|---|---|---|
| 2,111,975 | 3/1938 | Larsen et al. | 170—159(B)X |
| 2,574,980 | 11/1951 | Meyers | 170—159(H) |
| 2,694,458 | 11/1954 | Stevens | 170—159(H) |
| 2,754,917 | 7/1956 | Kee | 170—159(B) |
| 2,757,745 | 8/1956 | Verhage et al. | 170—159(H) |
| 3,018,832 | 1/1962 | Prewitt | 170—159(H) |
| 3,167,129 | 1/1965 | Shultz | 170—159(H) |
| 3,237,697 | 1/1966 | Ford et al. | 170—159(H) |
| 3,333,642 | 8/1967 | Kee | 170—159(H) |

EVERETTE A. POWELL, JR., Primary Examiner

U.S. Cl. X.R.

416—226